(12) United States Patent
Laldin

(10) Patent No.: US 9,917,495 B2
(45) Date of Patent: Mar. 13, 2018

(54) INTERIOR PERMANENT MAGNET MACHINE FOR AUTOMOTIVE ELECTRIC VEHICLES

(71) Applicant: Faraday&Future Inc., Gardena, CA (US)

(72) Inventor: Omar Abdul Rahman Laldin, Hermosa Beach, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 0 days.

(21) Appl. No.: 15/334,193

(22) Filed: Oct. 25, 2016

(65) Prior Publication Data
US 2017/0093258 A1   Mar. 30, 2017

Related U.S. Application Data

(63) Continuation of application No. 15/085,130, filed on Mar. 30, 2016, which is a continuation of application
(Continued)

(51) Int. Cl.
*H02K 21/12* (2006.01)
*H02K 21/14* (2006.01)
(Continued)

(52) U.S. Cl.
CPC ............ *H02K 21/14* (2013.01); *H02K 1/246* (2013.01); *H02K 1/2706* (2013.01); *H02K 1/278* (2013.01); *H02K 1/2753* (2013.01); *H02K 1/28* (2013.01)

(58) Field of Classification Search
CPC ................................. H02K 1/28; H02K 1/278
(Continued)

(56) References Cited

U.S. PATENT DOCUMENTS

| 4,139,790 A | 2/1979 | Steen |
| 4,649,331 A | 3/1987 | Jahns |

(Continued)

FOREIGN PATENT DOCUMENTS

| EP | 1978620 | 8/2008 |
| EP | 2485370 | 8/2012 |

(Continued)

OTHER PUBLICATIONS

International Search Report and Written Opinion issued in PCT/US2015/064741 dated Jul. 29, 2016.
(Continued)

*Primary Examiner* — Hanh Nguyen
(74) *Attorney, Agent, or Firm* — Knobbe Martens Olson & Bear LLP

(57) ABSTRACT

Certain aspects relate to topologies for an interior permanent magnet (IPM) electrical machine having increased saliency torque, increased flux-linkage, reduced magnet leakage flux, and reduced detrimental slotting effects compared to existing IPM electrical machines. The IPM electrical machine includes a rotor having a number of poles and a flux barrier formed along the edge of the rotor between poles. The flux barrier contains a magnet or set of magnets having a varying thickness, with a central thickest portion located along the d-axis of the rotor. A magnet retention structure, which may be formed integrally with the rotor or provided as a separate structure, surrounds the rotor and magnets. The rotor and magnets combine to form a smooth circular profile having no air gaps.

17 Claims, 11 Drawing Sheets

Related U.S. Application Data

No. 14/781,429, filed on Sep. 30, 2015, now Pat. No. 9,520,752.

(51) Int. Cl.
  *H02K 1/28* (2006.01)
  *H02K 1/24* (2006.01)
  *H02K 1/27* (2006.01)

(58) Field of Classification Search
  USPC ........................................ 310/156.01–156.84
  See application file for complete search history.

(56) References Cited

U.S. PATENT DOCUMENTS

| | | | |
|---|---|---|---|
| 4,748,359 A | 5/1988 | Yahara | |
| 4,954,736 A * | 9/1990 | Kawamoto | H02K 1/278 310/156.21 |
| 4,973,872 A * | 11/1990 | Dohogne | H02K 1/278 310/156.23 |
| 6,218,753 B1 | 4/2001 | Asano | |
| 6,424,069 B1 | 7/2002 | Pullen | |
| 6,486,581 B2 | 11/2002 | Miyashita | |
| 6,717,315 B1 | 6/2004 | Tajima | |
| 6,924,574 B2 | 8/2005 | Qu | |
| 7,459,821 B2 | 12/2008 | Cheong | |
| 7,843,101 B2 | 11/2010 | Ito | |
| 9,425,658 B2 | 8/2016 | Tomizawa | |
| 2004/0145263 A1 | 7/2004 | Kojima | |
| 2008/0007131 A1 | 1/2008 | Cai | |
| 2008/0218007 A1 | 9/2008 | Masuzawa | |
| 2009/0261676 A1 | 10/2009 | Randria | |
| 2012/0025654 A1 | 2/2012 | Bach | |
| 2012/0139465 A1 | 6/2012 | Harianto | |
| 2012/0181888 A1 | 7/2012 | Shibukawa | |
| 2013/0342066 A1 | 12/2013 | Taniguchi | |
| 2014/0152138 A1 | 6/2014 | Tanaka | |
| 2014/0265705 A1 | 9/2014 | Tsuchida | |

FOREIGN PATENT DOCUMENTS

| | | |
|---|---|---|
| GB | 1337785 | 8/2012 |
| WO | WO 2013080342 | 6/2013 |

OTHER PUBLICATIONS

Laldin, O, et al., "An Analytical Design Model for Hybrid Salient-Pole Machines," IEEE Electric Machines & Drives Conference, (May 2013).

Laldin, O., et al, "An Analytical Design Model for Wound Rotor Synchronous Machines," IEEE Electric Ship Technologies Symposium (Apr. 2013).

* cited by examiner

INTERIOR PERMANENT MAGNET MACHINE FOR AUTOMOTIVE ELECTRIC VEHICLES

CROSS-REFERENCE TO RELATED APPLICATIONS

The present application is a continuation of U.S. application Ser. No. 15/085,130, filed Mar. 30, 2016, entitled "AN INTERIOR PERMANENT MAGNET MACHINE FOR AUTOMOTIVE ELECTRIC VEHICLES," which is a continuation of U.S. application Ser. No. 14/871,429, filed Sep. 30, 2015, entitled "AN INTERIOR PERMANENT MAGNET MACHINE FOR AUTOMOTIVE ELECTRIC VEHICLES," the entirety of which is incorporated by reference herein.

TECHNICAL FIELD

The systems and methods disclosed herein are directed to interior permanent magnet machines, and, more particularly, to interior permanent magnet machines having improved machine performance for electric vehicle applications.

BACKGROUND

In recent years, high efficiency electric motors have become desirable to meet the challenges of providing power without the usage of fossil fuel sources, for example in hybrid and electric vehicles. Interior permanent magnet (IPM) motors have become popular due to their high efficiency performance, as an IPM is an increasingly efficient synchronous motor due to advances in high-energy permanent magnet technology, smart inverters, and digital controllers.

IPM electric machines have magnets built into the interior of the rotor, and each magnetic pole on the rotor is conventionally created by putting permanent magnet material into slots formed in the laminated stack of the rotor. Such slots are typically not completely filled with magnetic material, instead being designed to hold a magnet in the center with voids at two opposite ends of the slot. The rotor is rotatable within a stator which includes multiple windings to produce a rotating magnetic field in the frame of reference of the stator.

SUMMARY

One aspect relates to an interior permanent magnet electrical machine comprising a magnet retention structure comprising a circular inner perimeter having a radius; a rotor body comprising a magnetically permeable material configured for conducting magnetic flux, a plurality of rotor pole shoes, an outer edge of each of the plurality of rotor pole shoes having substantially the same radius as the circular inner perimeter of the magnet retention structure and positioned adjacent to the circular inner perimeter of the magnet retention structure, and a plurality of curved edges, each of the plurality of curved edges having a curvature and connecting outer edges of an adjacent two of the plurality of rotor pole shoes; and a plurality of flux barriers, each of the plurality of flux barriers comprising a curved outer edge having substantially the same radius as the circular inner perimeter of the magnet retention structure and positioned adjacent to the circular inner perimeter of the magnet retention structure, an inner edge having substantially the same curvature as the one of the plurality of curved edges and positioned adjacent to the one of the plurality of curved edges, and at least one low-permeability material filling an area formed between the outer edge and the inner edge, the at least one low-permeability material comprising at least one magnetized permanent magnet.

Another aspect relates to a rotor assembly for an interior permanent magnet electrical machine, the rotor assembly comprising a magnet retention structure comprising a circular inner perimeter having a radius; a rotor body comprising a plurality of rotor pole shoes, an outer edge of each of the plurality of rotor pole shoes having substantially the same radius as the circular inner perimeter of the magnet retention assembly; and a plurality of flux barriers each defined at least partly by a negative space in the rotor body, each of the plurality of flux barriers positioned between an adjacent two of the plurality of rotor pole shoes and having a largest thickness at its center that tapers toward a smallest thickness at opposing edges, each of the plurality of flux barriers comprising at least one permanent magnet.

Another aspect relates to a rotor assembly for an interior permanent magnet electrical machine, the rotor assembly comprising a magnet retention structure comprising a circular inner perimeter having a radius; a rotor body comprising a plurality of rotor pole shoes, an outer edge of each of the plurality of rotor pole shoes having substantially the same radius as the circular inner perimeter of the magnet retention assembly; and a plurality of magnetized permanent magnets positioned within the magnet retention structure, each permanent magnet of the plurality of magnetized permanent magnets positioned between two adjacent pole shoes of the plurality of rotor pole shoes and comprising a curved first edge having substantially the same radius as the circular inner perimeter of the magnet retention structure and positioned adjacent to the circular inner perimeter of the magnet retention assembly, and a curved second edge that, together with the curved first edge, defines a thickness of the permanent magnet that is thickest at a central portion of the permanent magnet and tapers toward opposing edges of the permanent magnet.

Another aspect relates to a rotor assembly for an interior permanent magnet electrical machine, the permanent magnet assembly comprising a magnet retention structure comprising a circular inner perimeter having a radius; a rotor body within the magnet retention structure, the rotor body having a plurality of pole shoes; at least a first permanent magnet set including a plurality of permanent magnets positioned within the magnet retention structure and between two adjacent pole shoes of the rotor body, the first permanent magnet set having a varying thickness that is greatest at a central portion of the first permanent magnet set and tapers toward opposing edges of the first permanent magnet set.

Another aspect relates to a permanent magnet assembly for an interior permanent magnet electrical machine, the permanent magnet assembly comprising a magnet retention structure comprising a circular inner perimeter having a radius; a plurality of diametrically magnetized permanent magnets positioned within the magnet retention structure, each permanent magnet of the plurality of diametrically magnetized permanent magnets comprising a curved first edge having substantially the same radius as the circular inner perimeter of the magnet retention structure and positioned adjacent to the circular inner perimeter of the magnet retention assembly, a curved second edge that, together with the curved first edge, defines a thickness of the permanent magnet that is thickest at a central portion of the permanent magnet and tapers toward opposing edges of the permanent magnet, a first pole located along the curved first edge, and a second pole located along the curved second edge.

Another aspect relates to a permanent magnet assembly for an interior permanent magnet electrical machine, the permanent magnet assembly comprising a magnet retention structure comprising a circular inner perimeter having a radius; a rotor body within the magnet retention structure, the rotor body having a plurality of pole shoes; at least a first permanent magnet set including a plurality of permanent magnets positioned within the magnet retention structure and between two adjacent pole shoes of the rotor body, the first permanent magnet set having a varying thickness that is greatest at a central portion of the first permanent magnet set and tapers toward opposing edges of the first permanent magnet set.

Another aspect permanent magnet for an interior permanent magnet electrical machine, the permanent magnet comprising a curved first edge having a circular radius selected to match a circular inner perimeter of a magnet retention structure; a sinusoidally curved second edge that, together with the curved first edge, defines a thickness of the permanent magnet, the thickness being greatest at a central portion of the permanent magnet and tapering toward opposing edges of the permanent magnet; a first pole located along the curved first edge; and a second pole located along the sinusoidally curved second edge.

BRIEF DESCRIPTION OF THE DRAWINGS

The disclosed aspects will hereinafter be described in conjunction with the appended drawings and appendices, provided to illustrate and not to limit the disclosed aspects, wherein like designations denote like elements.

DETAILED DESCRIPTION

Introduction

Embodiments of the disclosure relate to systems and techniques for magnet shape and placement, as well as rotor steel design, for improved performance of an interior permanent magnet (IPM) electrical machine.

In general, this disclosure is related to a topology for interior permanent magnet machines resulting in improved machine performance, for example higher saliency torque, increased flux-linkage, reduced magnet leakage flux, and reduced detrimental slotting effects. In permanent magnet motor design, because the space in the rotor is limited, proper utilization of magnetic material is a key consideration for machine performance. Dimensioning the magnets for proper aspect ratios at load conditions and at the same time to operate at optimum flux density level is a complex design consideration. Accordingly, attempts to improve the performance of interior permanent magnet machines are typically associated with design of the rotor assembly and magnet placement such that it will result in improved performance. Aspects of the IPM topologies of the present disclosure relate to changes in both magnet shape and placement, as well as rotor steel design.

The IPM topologies described herein produces at least four significant features to increase machine performance as compared to typical IPM and synchronous reluctance machines, which may be assisted by permanent magnets. These are: (1) the configuration of the rotor steel results in an increase in the $L_q/L_d$ ratio, resulting in higher saliency torque; (2) the placement of the magnets allows their deepest location to be centered to the so-called hypothetical d-axis winding, resulting in increased flux-linkage and therefore torque due to the magnets; (3) the shape and placement of the magnets results in certain areas of the rotor steel to be saturated using flux from a small section of the magnets, effectively reducing the amount of magnet leakage flux; and (4) the configuration of the rotor steel contains fewer layers (i.e. only one), effectively reducing the detrimental effects due to slotting including core losses, cogging torque, noise, and reduced harmonics in the open-circuit voltage.

Various embodiments will be described below in conjunction with the drawings for purposes of illustration. It should be appreciated that many other implementations of the disclosed concepts are possible, and various advantages can be achieved with the disclosed implementations. Headings are included herein for reference and to aid in locating various sections. These headings are not intended to limit the scope of the concepts described with respect thereto. Such concepts may have applicability throughout the entire specification.

Overview of Example Drive Systems Implementing IPMs

Figure 1:
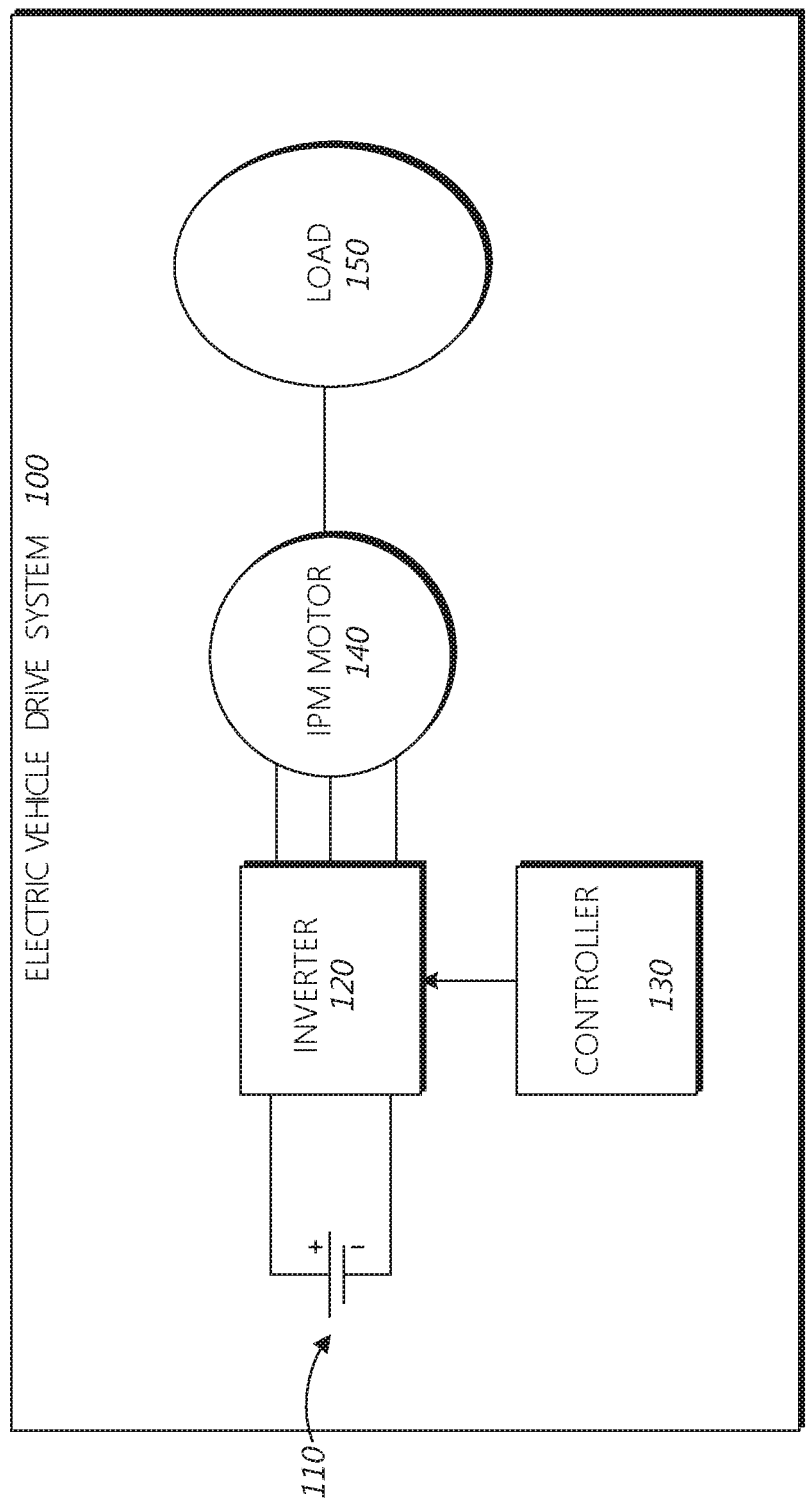
FIG. 1 is a block diagram of an example electric vehicle drive system including an interior permanent magnet motor as described herein.

FIG. 1 depicts a block diagram of an example electric vehicle drive system 100 including an IPM motor 140 as described herein. The electric vehicle drive system 100 includes a voltage source 110, inverter 120 coupled to the voltage source, current controller 130, IPM motor 140, and load 150.

The voltage source 110 is typically a single phase direct current (DC) source; however, single and multi-phase alternating current (AC) outputs are also possible. In some embodiments, voltage source 110 represents a rechargeable electric vehicle battery or traction battery used to power the propulsion of an electric vehicle including the drive system 100.

Inverter 120 includes power inputs which are connected to conductors of the voltage source 110 to receive one of DC power, single-phase electrical current or multi-phase electrical current. Additionally, the inverter 120 includes an input which is coupled to an output of current controller 130, described further below. The inverter 120 also includes three outputs representing three phases with currents that can be separated by 120 electrical degrees, with each phase provided on a conductor coupled to the IPM motor 140. It should be noted that in other embodiments inverter 120 may produce greater or fewer than three phases.

The IPM motor 140 is fed from voltage source inverter 120 controlled by current controller 130. The inputs of IPM motor 140 are coupled to respective windings distributed about a stator. The IPM motor 140 can be coupled to a mechanical output, for example a mechanical coupling between the IPM motor 140 and mechanical load 150. Mechanical load 150 may represent one or more wheels of the electric vehicle.

Controller 130 can be used to generate gate signals for the inverter 120. Accordingly, control of vehicle speed is performed by regulating the voltage or the flow of current from the inverter 120 through the stator of the IPM motor 140. There are many control schemes that can be used in the electric vehicle drive system 100 including current control, voltage control, and direct torque control. Selection of the characteristics of inverter 120 and selection of the control technique of the controller 130 can determine efficacy of the drive system 100.

Although not illustrated, the electric vehicle drive system 100 can include one or more position sensors for determining position of the rotor of IPM motor 140 and providing this information to the controller 130. For example, the IPM motor 140 can include a signal output that can transmit a position of a rotor assembly of the IPM motor 140 with respect to the stator assembly IPM motor 140. The position sensor can be, for example, a hall-effect sensor, potentiometer, linear variable differential transformer, optical encoder, or position resolver. The saliency exhibited by IPM motor 140 can also allow for sensorless control applications. The saliency signature of IPM motor 140 can be strong enough that it can be used to determine rotor position at standstill and low speed operating conditions. Some sensorless designs can use saliency mapping at low speeds and then transition to a back-EMF observer model as the IPM motor 140 speeds up.

Although not illustrated, the electric vehicle drive system 100 can include one or more current sensors for determining phase currents of the stator windings and providing this information to the controller 130. The current sensor can be, for example, a hall-effect current sensor, a sense resistor connected to an amplifier, or a current clamp.

It should be appreciated that while the IPM motor 140 is depicted as an electrical machine that can receive electrical power to produce mechanical power, it can also be used such that it receives mechanical power and thereby converts that to electrical power. In such a configuration, the inverter 120 can be utilized to excite the winding using a proper control and thereafter extract electrical power from the IPM motor 140 while IPM motor 140 is receiving mechanical power.

Overview of Example IPM Topologies

Figure 2A:
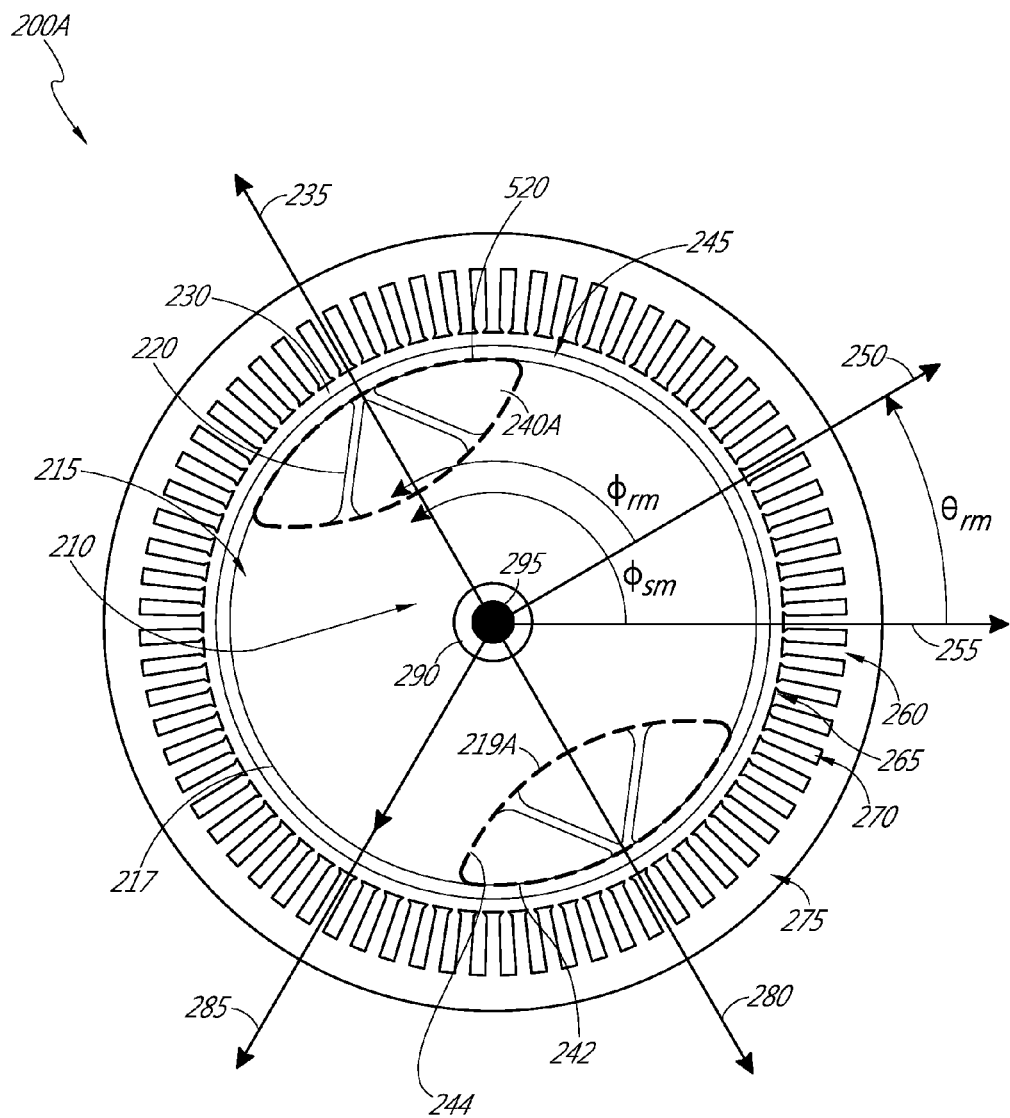
FIGS. 2A-2C illustrate cross sectional schematic views of various embodiments of the topology of an IPM.
Figure 2B:
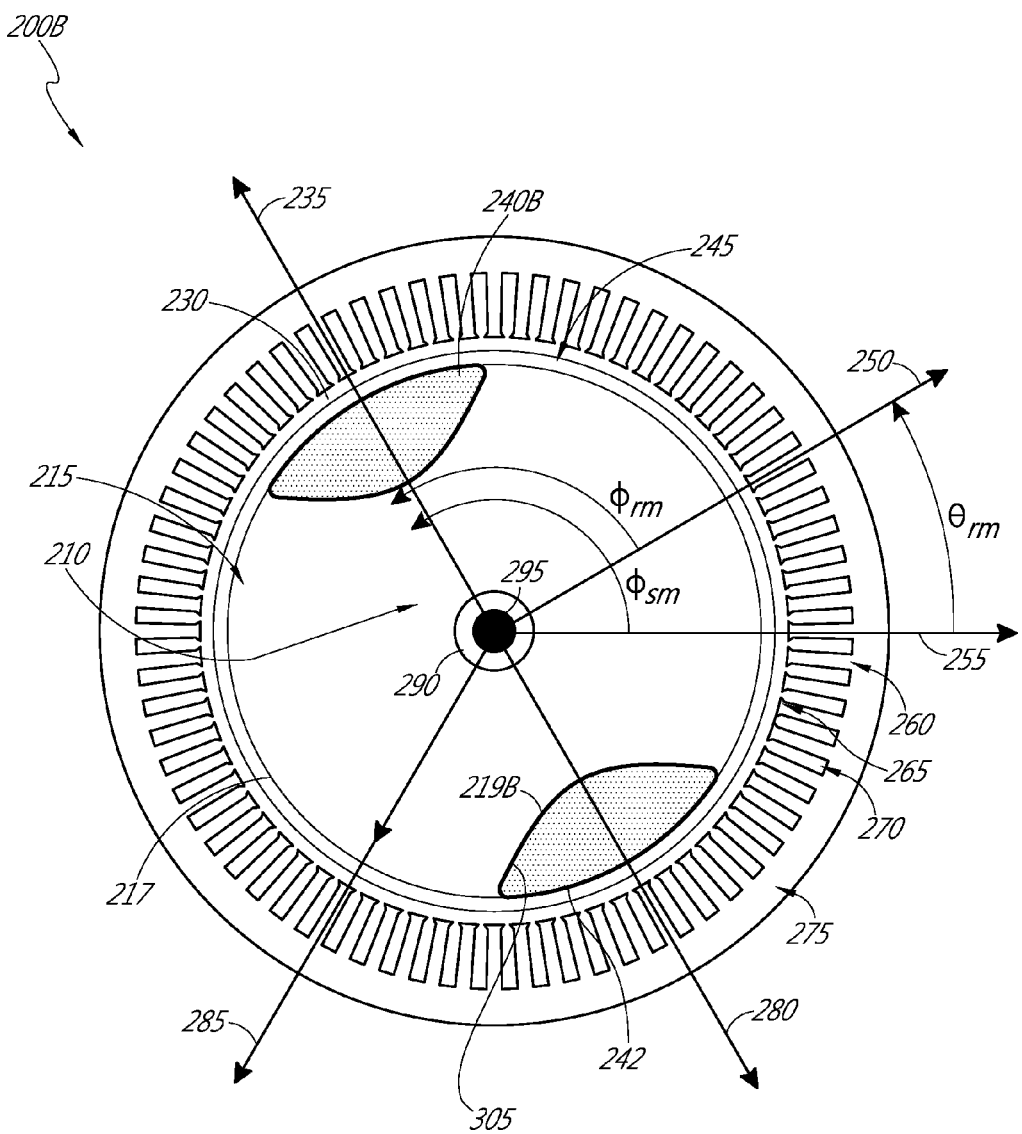

FIGS. 2A and 2B illustrate cross sectional schematic views of various embodiments of the topology of an IPM electrical machine 200A, 200B having improved performance according to the present disclosure.

FIG. 2A illustrates an example topology for an IPM electrical machine 200A having a set of multiple permanent magnets 240A between each pole, the magnets 240A in each set separated by magnet supports 220. As used herein, "topology" refers to the arrangement of the different components of the IPM electrical machine 200A.

The IPM electrical machine 200A includes a magnetically permeable cylindrically shaped stator assembly 270 having at least one stator winding (not illustrated) formed about a plurality of stator teeth 260 separated by slots 270. The stator teeth 260 contain, at one end, the stator tooth-tips 265, which aid in retaining the stator winding. The stator assembly 270 is configured to remain stationary. The stator assembly 270 can be made of a stack of multiple thin layers of electrical steel, for example punched to produce the desired cross-sectional topology, stacked, and laser welded together. The IPM electrical machine 200A also contains an electrical connection coupled to each stator winding.

A rotor assembly is placed concentrically within the stator assembly. In FIG. 2A, the components of the rotor assembly are the rotor 210, drive mechanism 290, 295, poles 215, magnets 240A, magnet retention structure 245, and magnet supports 220. The magnetically permeable rotor 210 is used to conduct magnetic flux. Rotational drive mechanism (an example of which is depicted as inert rotor 290 and shaft 295) is coupled to the rotor 210 and configured to rotate in association with the rotor 210. Though the rotational drive mechanism is depicted as inert rotor 290 and shaft 295, other mechanisms can be used in other implementations. The rotor 210 includes a number of protruding rotor poles formed by pole shoes 215, with one pole shoe 215 for each rotor pole. Concavely curved sides of the rotor backiron 219A define adjacent pole shoes 215. Accordingly, in the presented embodiment having two poles, the cross-sectional shape of the rotor 210 is a curvilinear quadrilateral having two opposing convex sides defined by sides of the rotor backiron 217 and two opposing concave sides defined by sides 219A, wherein the opposing convex sides 217 are curved along the radius of a circle along the inner surface of the stator separated thereform by air gap 230. In embodiments having four or more poles, the cross-sectional shape of the rotor changes according to the number of poles to be a main body with a number of protrusions equal to the number of poles, each protrusion having a convexly curved outer edge following a portion of the circumference of the same circle. The cross-sectional shape of the rotor in four or more pole embodiments further has a concave curve between each set of adjacent protrusions, wherein the concave curve matches the curvature of a magnet positioned between the adjacent protrusions.

One embodiment of the rotor 210 can be made of a stack of multiple thin layers of electrical steel, for example punched or laser cut to produce the desired cross-sectional topology, stacked, and laser welded together. In one embodiment, the rotor layers can be steel laminate with insulation and/or adhesive provided on both faces. Generally, the rotor 210 is made of any magnetically permeable material suitable for conducting magnetic flux. The configuration of the rotor 210 results in an increase in the $L_q/L_d$ ratio, resulting in higher saliency torque. Additionally, the configuration of the rotor 210 contains fewer layers of magnets or flux barriers (i.e. only one), effectively reducing the detrimental effects due to slotting. Such detrimental slotting effects include core losses, cogging torque, noise, and reduced harmonics in the open-circuit voltage.

Further, between each of the protruding rotor pole shoes 215, the rotor assembly contains one or more radially or approximately radially magnetized permanent magnets 240A arranged about the pole shoe assembly between the rotor backiron sides 219A and the stator. The IPM electrical machine 200A may use any suitable type of magnet. For example, some implementations can use either non-rare earth (ferrite) magnets or rare earth magnets, such as NdFeB. Ferrite magnets are less expensive, but produce a lower performance compared to rare earth magnets when utilized in identically configured IPM machines. Some implementations can use AlNiCo magnets or bonded magnets, for example plastiform bonded with shavings of rare earth or non-rare earth materials. As shown in the embodiment of FIG. 2A, between each pole shoe 215 a number of magnets 240A are shaped and positioned to form a single flux barrier 520 having substantially no air gaps or voids as it is completely filled with low permeability material (for example, magnet or magnetically inert material such as plastic) and support 220 material, the flux barrier having a varying cross-sectional thickness with the thickest portion located in the region around the d-axis 280.

The magnets can have radiused corners instead of sharp corners, so the flux barrier 520 also can have radiused corners. Accordingly, due to the shape of magnets 240A and the varying thickness of the set of magnets 240A between curved outer edge 242 and curved inner edge 244, the flux barrier 520 cross-section is shaped as a convex curvilinear two-sided shape (referred to as a "lens-shaped") with radiused vertices. Flux barrier 520 is depicted for purposes of illustration, and it should be understood that the flux barrier 520 itself is not a physical structure in the topology of the IPM electrical machine 200A, but rather an effect of the shape of the rotor 210.

The placement of the magnets 240A allows the deepest (or thickest) location of the flux barriers to be centered to the so-called hypothetical d-axis winding, resulting in increased flux-linkage and therefore torque due to the magnets. Further, the shape and placement of the magnets 240A results in certain areas of the rotor 210 to be saturated using flux from a small section of the magnets 240A, effectively reducing the amount of magnet leakage flux, as discussed in more detail below with respect to FIG. 5.

The magnets 240A are retained against the rotor 210 during rotation of the rotor assembly by a magnet retention structure 245. Further, magnet supports 220, numbering from one to many based on the number of magnets 240A in each flux barrier, may be used to provide additional support for the magnets 240A. These supports 220 may be arranged in an angled configuration, as indicated in FIG. 2A, or a parallel configuration. The points of contact between the magnet supports 220 to each other, to the rotor pole shoes 215, and/or to the magnet retention structure 245 may be filleted or radiused, for example to accommodate the rounded corners of the magnets 240A. In some embodiments magnet retention structure 245 may be a ring-shaped component of the rotor lamination, for example formed integrally with the rotor 210 and magnet supports 220 as a punched or cut steel laminate. A sleeve made of a carbon fiber or other high strength material may alternatively or additionally be utilized. The supports 220 may provide structural benefits for retaining magnets 240A during rotation of the rotor assembly. As illustrated, the rotor 210 (including any support portions 220) and magnets 240A combine to form a smooth circular profile within the magnet retention structure 245.

Although multiple magnets 240A are shown in the flux barrier, in other embodiments a single magnet having the shape of flux barrier 520 can be used and supports 220 may be omitted. For example, the single magnet can occupy the entire area between the curved outer edge 242 and curved inner edge 244 of the set of magnets 240A. In other embodiments, differing numbers of magnets 240A than are illustrated can be provided in each flux barrier 520, for example two, four, or more magnets. The magnets combine to form the lens-shaped area of the flux barrier between curved outer edge 242 and curved inner edge 244.

The d-axis 280 refers to the axis of one of the hypothetical rotating stator windings, which is aligned with the center of the rotor magnet poles. The positive d-axis represents the north pole of magnetized direction, on which the main magnetic flux due to the rotor 210 flows from rotor 210 through the air-gap 230 into the stator 275. The q-axis 250 refers to the quadrature or interpolar axis that leads the d-axis 280 by 90°. The axes of the three phases a, b, and c of the stator winding are shown by as-axis 255, bs-axis 285, and cs-axis 235. The angle between the q-axis 250 and the a-phase of the stator winding along as-axis 255, which may also be considered to be the angular position of the rotor 210, is denoted by $\theta_{rm}$. The IPM electrical machine 200A has different inductances along the d-axis 280 and q-axis 250, which results in reluctance torque.

In FIGS. 2A and 2B, $\theta_m$ represents the rotor position, $\phi_{rm}$ represents the mechanical position relative to the rotor, and $\phi_{sm}$ represents the mechanical position relative to the stator. The electrical equivalents of these angles can be obtained as:

$$\varphi_x = \frac{P}{2}\varphi_{xm} \tag{1}$$

where $\phi$ may be $\theta$ or $\phi$, x may be s or r, signifying stator or rotor, and P is the number of poles. Although the configuration of FIGS. 2A and 2B are depicted with two poles, any even number of poles (for example 4 or 6) can be used in other embodiments.

FIG. 2B illustrates an example topology for an IPM electrical machine 200B having a single magnet 240B between each rotor pole. Like components with the topology shown in FIG. 2A are designated using the same reference numbers.

Each of magnets 240B has an axial cross section that defines a varying thickness of the magnet along its circumferential extent. This varying thickness is due to the shape of the curved outer edge 242 and curved inner edge 305. In the embodiment of FIG. 2B, the curved inner edge 305 is formed as the shape of the sinusoidal wave determined based at least partly on a d-axis winding function for the rotor 210 associated with the permanent magnet 240B, as discussed more with respect to FIGS. 3A and 3B. The curved surface 219B connecting adjacent pole shoes 215 of the rotor 210 can be shaped accordingly to match the sinusoidal inner edge 305. The vertices connecting the curved outer edge 242 and curved inner edge 305 may be filleted.

In the embodiment of FIG. 2B, the magnet retention structure 245 may be a separate sleeve from the rotor 210 made of an appropriate material, for example a carbon fiber or other composite sleeve (tubular structure) sized to fit around the rotor assembly (rotor 210 and magnets 240B) and along the length of the rotor stack. Magnet retention structure 245 may also be a ring-shaped component of the rotor 210, for example formed integrally with the rotor 210 as a punched or cut steel laminate. As illustrated, the rotor 210 and magnets 240B combine to form a smooth circular profile having no air gaps, thereby reducing detrimental effects due to slotting.

As illustrated, the magnet retention structure 245 has a circular outer perimeter forming an inner boundary of the air gap 230 between the rotor assembly and the stator assembly, and the magnet retention structure 245 also has a circular inner perimeter. A convexly curved outer edge 217 of each of the rotor pole shoes 215 has substantially the same radius as the circular inner perimeter of the magnet retention structure 245 and is positioned adjacent to the circular inner perimeter of the magnet retention structure 245. Between each of the pole shoes 215, the rotor 210 has a concavely curved edge 219A, 219B connecting outer edges of an adjacent two of the rotor pole shoes 215, concavely curved edge 219A, 219B also forming boundary of a negative space in the rotor 210, the negative space being the flux barrier containing the permanent magnets 240A.

In one embodiment, each of the of flux barriers (that is, the region within the magnet retention structure 245 that is not occupied by the poles and body of the rotor 210, inert rotor 290, and shaft 295) of the rotor 210 is bounded by a convexly curved outer edge 242 and a curved inner edge 244. The convexly curved outer edge 242 can have substantially the same radius as the circular inner perimeter of the magnet retention structure 245 and be positioned adjacent to the circular inner perimeter of the magnet retention structure 245. The inner edge 244, 305 can have substantially the same curvature as the one of the curved edges 219A, 219B of the rotor 210 between adjacent pole shoes 215, and the inner edge can be positioned adjacent to the curved edge. As depicted in the embodiment of FIG. 2A, the inner edge 244 can have a circular radius in some embodiments that is different than or the same as the circular radius of the curved outer edge 242. In other embodiments, as depicted in the embodiment of FIG. 2B, the inner edge 305 can have a sinusoidal curvature.

According to the disclosed topology, each flux barrier includes at least one solid filling the area formed between the outer edge 242 and the inner edge 244, 305 such that there are substantially no air gaps in the flux barrier. Due to the inner edge 244, 305 and outer edge 242, each flux barrier (and therefore the magnet 240B or set of magnets 240A contained therein) has a largest thickness at its center that tapers toward a smallest thickness at opposing edges. This central, thickest portion of the permanent magnet 240B or set of permanent magnets 240A is located in the region of a d-axis of the rotor body The permanent magnet 240B or set of permanent magnets 240A within the flux barrier can be diametrically magnetized such that one pole is located along the outer edge 242 and the other pole is located along the inner edge 244. In the embodiment of FIG. 2B, a location corresponding to a peak amplitude of the sinusoidal wave used to generate the curvature of edge 305 can be located along the d-axis of the rotor.

The improvement in machine saliency provided by the topologies of FIGS. 2A and 2B as well as the variations not illustrated but described herein is first is demonstrated by way of expressions below and subsequently by way of example, discussed with respect to FIGS. 4A-4C. The number of turns enclosed by a given winding at a given electrical position relative to the rotor 210 is obtained from its winding function. The winding functions for the q-axis 250 and d-axis 280 are, respectively:

$$w_{qs}(\phi_r) = \frac{2N_{s1}}{P}\cos(\phi_r) \quad (2)$$

$$w_{ds}(\phi_r) = \frac{2N_{s1}}{P}\sin(\phi_r) \quad (3)$$

where $N_{s1}$ is the fundamental conductor turns density and a continuous approximation of the winding is assumed. It is noted a distributed winding is assumed herein and all variables are in the reference frame of the rotor 210. The flux density in the air-gap can be approximated by considering the magnetomotive-forces (MMFs) due to the stator windings and permanent magnets, as well as the permeance density along the path through which the flux flows:

$$B(\phi_r) = \left\{\frac{3}{2}[w_{qs}(\phi_r)i_{qs} + w_{ds}(\phi_r)i_{ds}] + B_{pm}(\phi_r)R_{ms}(\phi_r)\right\}P_a(\phi_r) \quad (4)$$

where, $i_{qs}$ and $i_{ds}$ are the q- and d-axis currents, $B_{pm}$ is the magnet residual flux density function, $R_{ms}$ is the source quasi-reluctance of the magnets, $P_a$ is the permeance density along the sections of the flux path in air, conductors, or magnets (with the present assumption being that these materials have magnetic permeabilities close to that of air).

Using Equation (4), the following expressions for the q- and d-axis inductances are obtained:

$$L_q = \frac{1}{i_{qs}}r_{ag}l\int_0^{2\pi}B_{qs}(\phi_r)w_{qs}(\phi_r)d\phi_r \quad (5)$$

$$= r_{ag}l\int_0^{2\pi}\frac{3}{2}w_{qs}^2(\phi_r)P_a(\phi_r)d\phi_r$$

$$L_d = r_{ag}l\int_0^{2\pi}\frac{3}{2}w_{ds}^2(\phi_r)P_a(\phi_r)d\phi_r \quad (6)$$

From Equations (5) and (6), high permeance values closer to the peak of a given winding function results in a higher self-inductance pertaining to that winding.

The electromagnetic torque produced by an IPM electric machine is obtained by:

$$T_e = \frac{3}{2}\frac{P}{2}[\lambda_{dpm}i_{qs} + (L_d - L_q)i_{ds}i_{qs}] \quad (7)$$

where $\lambda_{dpm}$ is the d-axis flux linkage due to the permanent magnets, as obtained in Equation (8), discussed below. As the IPM electrical machine is typically controlled to have negative $i_{ds}$, a requirement for increased saliency torque is to have $L_q \gg L_d$. It is therefore preferable to reduce $L_d$ and increase $L_q$.

With respect to the reduced effects due to slotting, using multiple rotor slots or flux barriers (that is, in the examples of FIGS. 2A and 2B, the space between rotor surface 219A, 219B and the inner circumference of the magnet retention structure 245) can result in fluxes changing significantly in time as the result of the rotor branches (that is, pole shoes 215) aligning with the stator teeth 260 at one time and the stator slots 270 at another time. As a result, the stator teeth 260 and rotor branches (pole shoes 215) both see flux density changing significantly at the slotting frequency. This effect leads to an increase in core losses. Further, the changes in flux density result harmonic noise in the rotor back-emf, as well as in cogging torque, which in turn tends to produce noise.

Figure 2C:
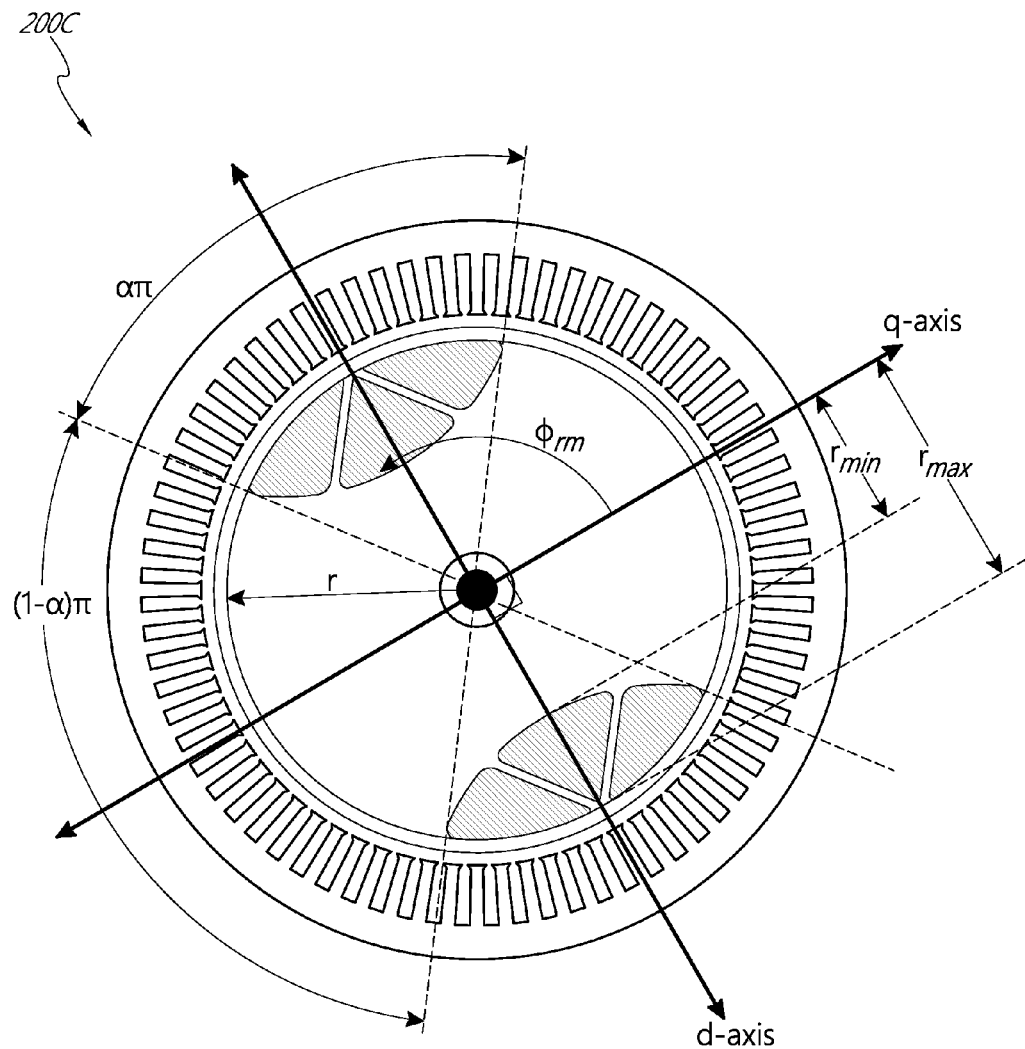

FIG. 2C illustrates the IPM machine of FIG. 2A with labels showing a q-axis, a d-axis, an indicating the span of a permanent magnet in electrical angles and also used to indicate the span (in electrical angles) of a rotor pole, radius r of the rotor (including noting $r_{max}$ and $r_{min}$), and angle $\phi_r$ indicating the electrical angular position around the rotor relative to the q-axis. Equation (1) above provides the electrical equivalents of mechanical positions around the rotor. These will be discussed in more detail below with respect to FIGS. 3C and 3D. Though illustrated for the IPM machine of FIG. 2A, the same parameters apply to the IPM machine of FIG. 2B. The size and shape of the magnet (or set of magnets) between adjacent rotor poles may be determined based on three features. First, as described herein, the thickness of the magnet or magnet set can vary by having one edge following a circular radius and an opposite edge following another curve, and that curve can be a sinusoidal curve, circular curve, hyperbolic curve, parabolic curve, elliptical curve, or cubic curve. Second, at its central thickest portion, the magnet or magnet set can have a thickness of $r_{max}$ minus $r_{min}$, and $r_{min}$ can range from 5% to 95% of $r_{max}$ in various implementations. Third, the span an of the magnet or magnet set (in electrical angles) can range from 5% to 95% of the pole span, where the pole span may be 180° in electrical angles. The size and shape of the magnet or magnet set can be optimized based on the size and/or operational parameters of the IPM machine.

The IPM machine of FIGS. 2A-2C is expected to have improved performance in the above-described respects due in part to the continuous circular profile of the rotor and magnets, the topology providing only a single layer of magnets, and the absence of substantial air gaps within the rotor assembly.

Overview of Example Permanent Magnets

Figure 3A:
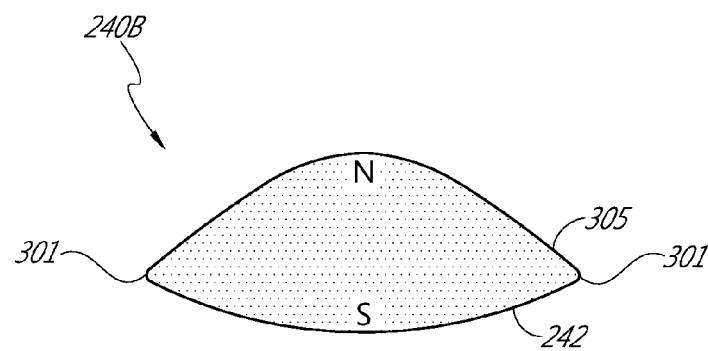
FIG. 3A illustrates one embodiment of a permanent magnet for use with the IPM motors described herein.

FIG. 3A illustrates one embodiment of permanent magnet 240B for use with the IPM motors described herein. As described above, the magnet 240B has a varying cross-sectional thickness between curved edge 242 and curved edge 305. Magnet 240B also has radiused vertices 301. FIG. 3A illustrates an approximation of the diametric magnetization of the permanent magnet 240B with one pole located along edge 242 and another pole located along edge 305. As a result of the magnetization, the highest flux corresponds to the central, thickest portion of the permanent magnet 240B and the lowest flux occurs at the opposing tapered edges near radiused vertices 301. Permanent magnet 240B can be made of non-rare earth materials, for example Sr-ferrite and alnico magnetic materials, or rare earth materials. Rare earth materials include neodymium magnets, for example $Nd_2Fe_{14}B$, as well as samarium-cobalt magnets, for example $SmCo_5$, $Sm_2Co_{17}$, $Sm(CoFeCu)_7$, and $Sm(CoFeCuZr)_7$. The foregoing examples are provided as a non-limiting listing of possible permanent magnet materials for some implementations of the disclosed motors, and other suitable permanent magnet materials can be used in other implementations.

Typical IPM motors use rectangular permanent magnets as these are simple to manufacture. However, having a constant magnet depth fails to take advantage of the possibility increasing the flux density at the peak.

The magnet torque is a result of the flux linkage due to the magnets. This parameter is approximately obtained as:

$$\lambda_{dpm} = r_{ag}l \int_0^{2\pi} [B_{pm}(\phi_r) R_{ms}(\phi_r) P_a(\phi_r)] w_{ds}(\phi_r) d\phi_r \quad (8)$$

Similar to the benefits seen in the saliency torque, from the above expression, it is advantageous to have the magnet MMF aligned with the peak of $w_{ds}$. Further, it is valuable to increase the flux density due to the magnets at the peak of the $w_{ds}$; this is achieved in the disclosed machine by having increased magnet depth (thickness) at this location. The rotor steel for machine in some previous IPMs tends to disperse the magnet flux over a wider area, effectively reducing the flux linkage. Further, having a constant magnet depth fails to take advantage of the possibility additionally increasing the flux density at the peak.

Figure 3B:
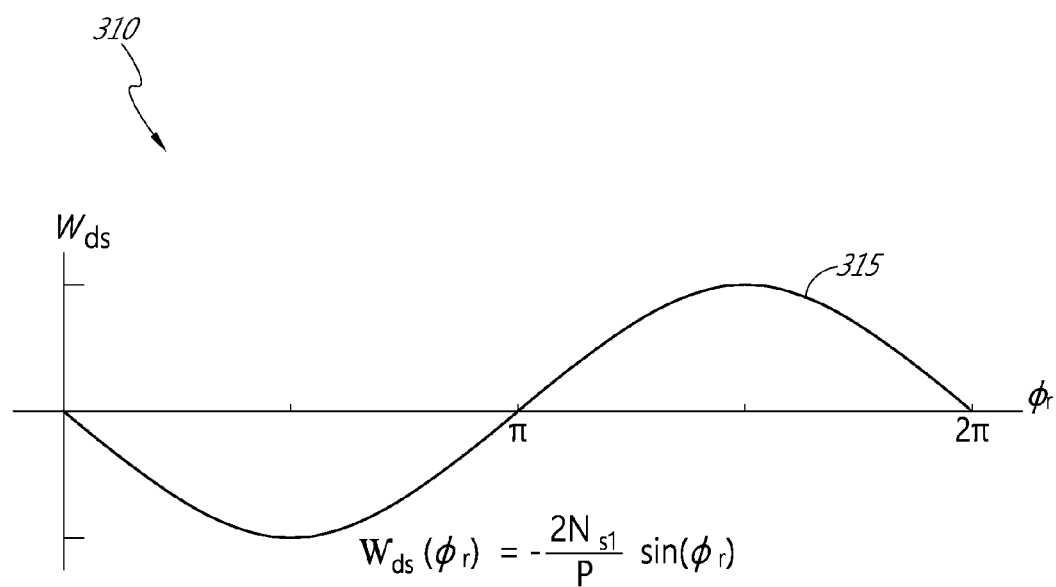
FIG. 3B illustrates an example function usable for determining the shape of the magnet of FIG. 3A, which also describes the d-axis winding.

FIG. 3B illustrates an example function usable in some embodiments for determining the shape of the magnet of FIG. 3A. As illustrated, the function is the same as the d-axis winding function specified above in Equation (3). A portion 315 of the function corresponding to half of a period of the sinusoidal wave 310 is used to generate the curvature 305 of the permanent magnet 240B such that the thickness formed by curved edges 305 and 242 generally follows the integral of the portion 315. By matching the curve of the magnet to the curve determined by the d-axis winding function, flux density can be increased while optimizing magnet material. Although some of the described embodiments of permanent magnets have thickness varying according to a sinusoidal curve, other curves can be used in other embodiments to produce a magnet having a varying thickness, for example circular, hyperbolic, parabolic, elliptical, or cubic curves.

In some embodiments, both curves 242, 305 of the permanent magnet can be matched or approximately matched to the d-axis winding function sinusoidal curve. Such a magnet may be positioned in a correspondingly shaped cavity in the rotor between rotor pole shoes.

Figure 3C:
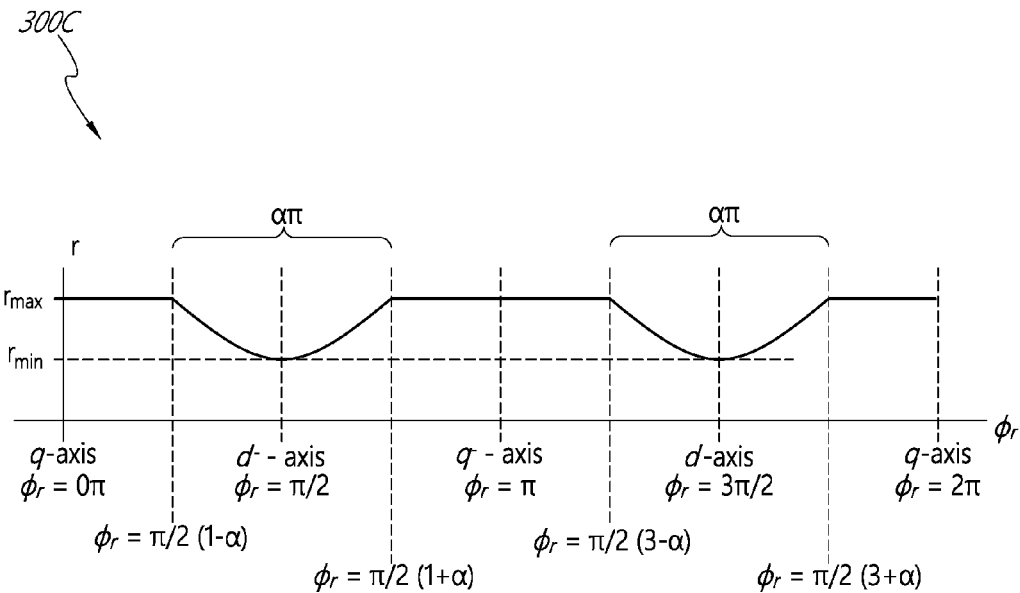
FIGS. 3C and 3D illustrates example graphs of the rotor radius as a function of the angular position around the rotor.
Figure 3D:
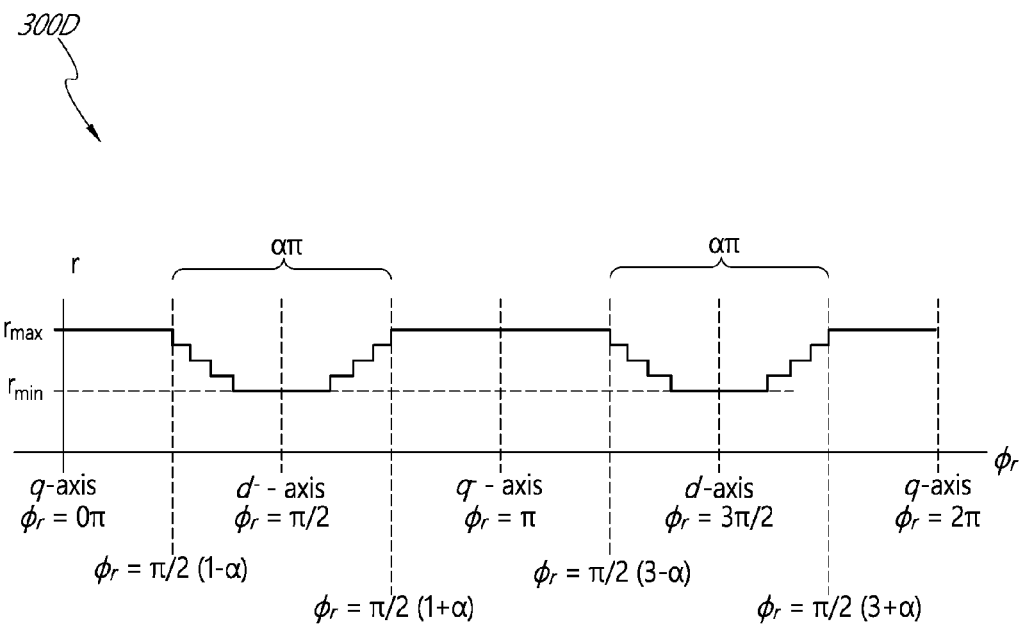
Figure 3E:
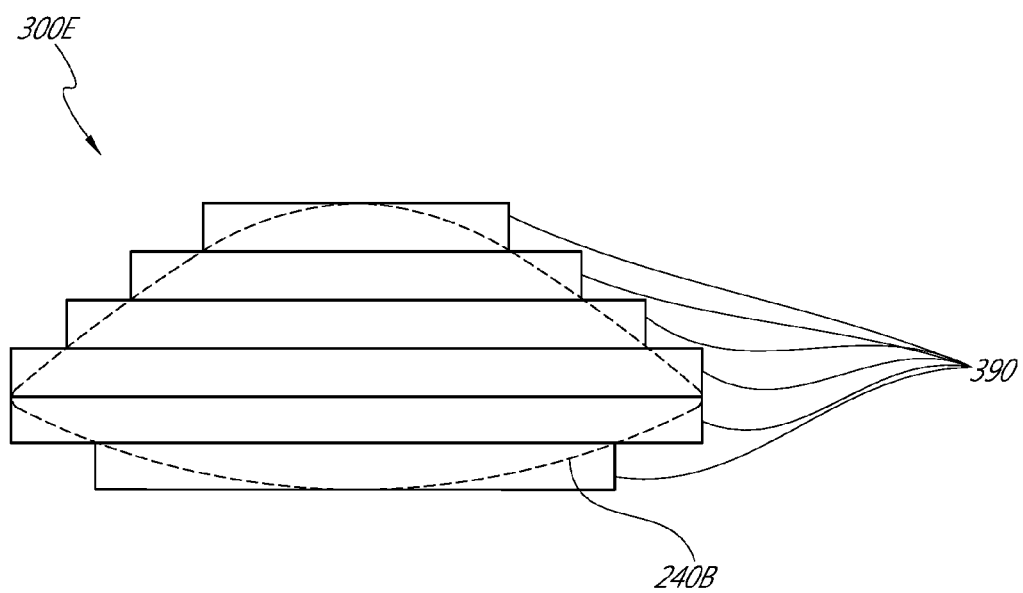
FIG. 3E illustrates another embodiment of the permanent magnet of FIG. 3A.

FIG. 3C illustrates an example graph 300C of the rotor radius r as a function of $\phi_r$, the electrical angular position around the rotor relative to the q-axis, for a rotor assembly having lens-shaped magnet as described herein. FIG. 3D illustrates an example graph 300D of the rotor radius r as a function of $\phi_r$ for a rotor assembly having a stack of rectangular magnets approximating a lens shape, as depicted in FIG. 3E, discussed below. The graphs of FIGS. 3C and 3D present example developed diagrams showing the rotor circumference developed along a straight line.

The q-axis, d-axis, an indicating the span of a permanent magnet and also used to indicate the span of a rotor pole, radius r of the rotor (including $r_{max}$ and $r_{min}$), and angle $\phi_r$ indicating the electrical angular position around the rotor relative to the q-axis are annotated on FIG. 2C.

As illustrated in the graph 300C of FIG. 3C, the radius of the rotor corresponds to a maximum value $r_{max}$ between values of $\phi_r=0$ and $\phi_r=\pi/2(1-\alpha)$, between values of $\phi_r=\pi/2(1+\alpha)$ and $\phi_r=\pi/2(3-\alpha)$, and again between values of $\phi_r=\pi/2(3+\alpha)$ and $\phi_r=2\pi$. Further, in each span of angle $\alpha\pi$, the radius r of the rotor decreases inversely proportional to a corresponding portion of the winding function shown in FIG. 3B, reaching a minimum rotor radius $r_{min}$ at $\phi_r=\pi/2$ corresponding to the of d-axis and again at $\phi_r=3\pi/2$ corresponding to the d-axis.

Similarly, as illustrated in the graph 300D of FIG. 3D, the radius of the rotor corresponds to a maximum value $r_{max}$ between values of $\phi_r=0$ and $\phi_r=\pi/2(1-\alpha)$, between values of $\phi_r=\pi/2(1+\alpha)$ and $\phi_r=\pi/2(3-\alpha)$, and again between values of $\phi_r=\pi/2(3+\alpha)$ and $\phi_r=2\pi$. However, in each span of angle $\alpha\pi$, the radius r of the rotor decreases in a stepped fashion to accommodate the magnet set of FIG. 3E. In each span of angle $\alpha\pi$, the radius r of the rotor reaches a minimum rotor radius $r_{min}$ for a distance centered on $\phi_r=\pi/2$ corresponding to the of d-axis and again at $\phi_r=3\pi/2$ corresponding to the d-axis. The distance for which the rotor radius $r=r_{min}$ is dependent on the length of the uppermost magnet in the stack of FIG. 3E.

FIG. 3E illustrates an example permanent magnet stack 300E including a plurality of rectangular magnets 390 that approximates the curvature of the lens-shaped magnet 240B by having a largest thickness at a central portion thereof that tapers toward opposing edges. As will be appreciated, the flux barrier formed in the rotor laminate can be shaped to match the outer perimeter of the stack 300E. The permanent magnet stack 300E is not as efficient a use of material as the lens-shaped permanent magnet 240B while producing similar torque, however may be less costly to manufacture and/or more accessible than a lens-shaped magnet. Although six rectangular magnets 390 are shown in the example permanent magnet stack 300E, in other implementations greater or fewer magnets can be provided to approximate the curvature of the lens-shaped magnet 240B. In general, increasing the number of magnets 390 and decreasing the thickness of some or all of the magnets can more closely approximate the curvature of the lens-shaped magnet 240B. In some embodiments, trapezoidal magnets rather than rectangular magnets can be used to approximate the curvature of the lens-shaped magnet 240B.

Overview of Performance Examples

For some conventional IPM electrical machines, the introduction of flux barriers, which spread out the rotor steel, results in the peak flux being distributed over a wider area. As a result, the amount of flux linking the peak of the d-axis winding can be significantly reduced.

To follow up the expressions above with an example also demonstrating the improved machine saliency of an IPM machine with features similar to those discussed above with respect to FIGS. 2A and 2B, a 4-pole machine, with $N_{s1}=50$, rotor stack length of 120 mm, and air-gap radius of 90 mm is considered. Two cases are considered, with the first containing multiple (here, two) rotor steel layers (as in a synchronous reluctance machine or IPM electrical machine producing the example permeance density waveform of FIG. 4B) and the second containing a single layer (as in a synchronous reluctance machine or IPM electrical machine producing the example permeance density waveform of FIG. 4C). It is also assumed that the inter-pole span (i.e. the gap between adjacent poles) of the multi-layer case is 50%.

Figure 4A:
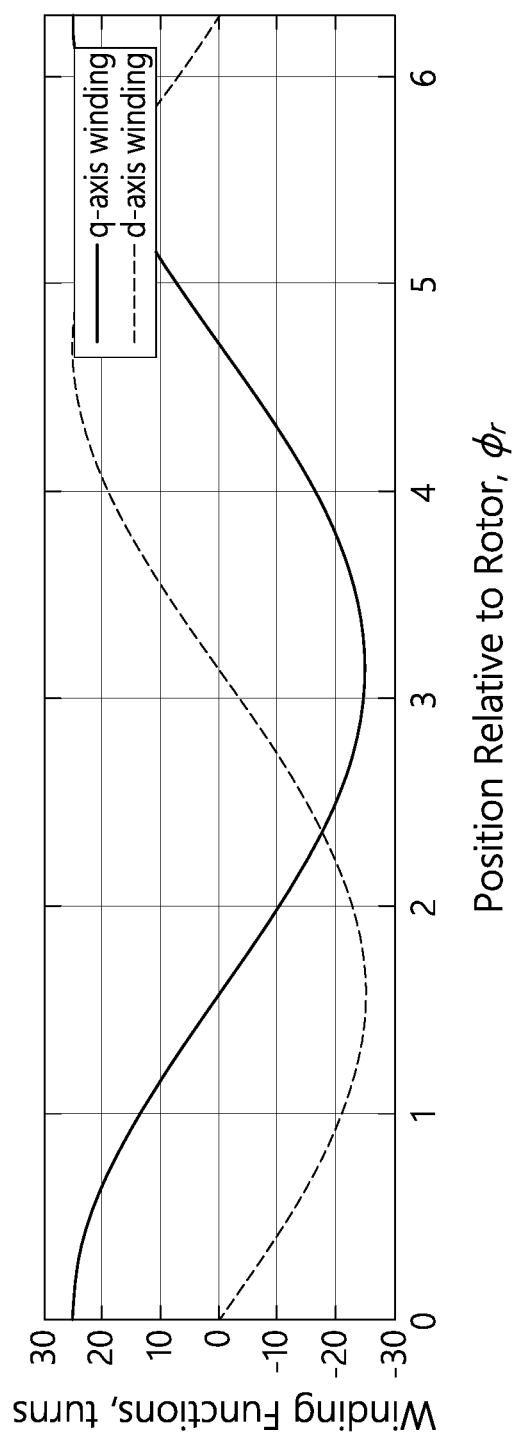
FIG. 4A illustrates example winding functions for an IPM motor as described herein.
Figure 4B:
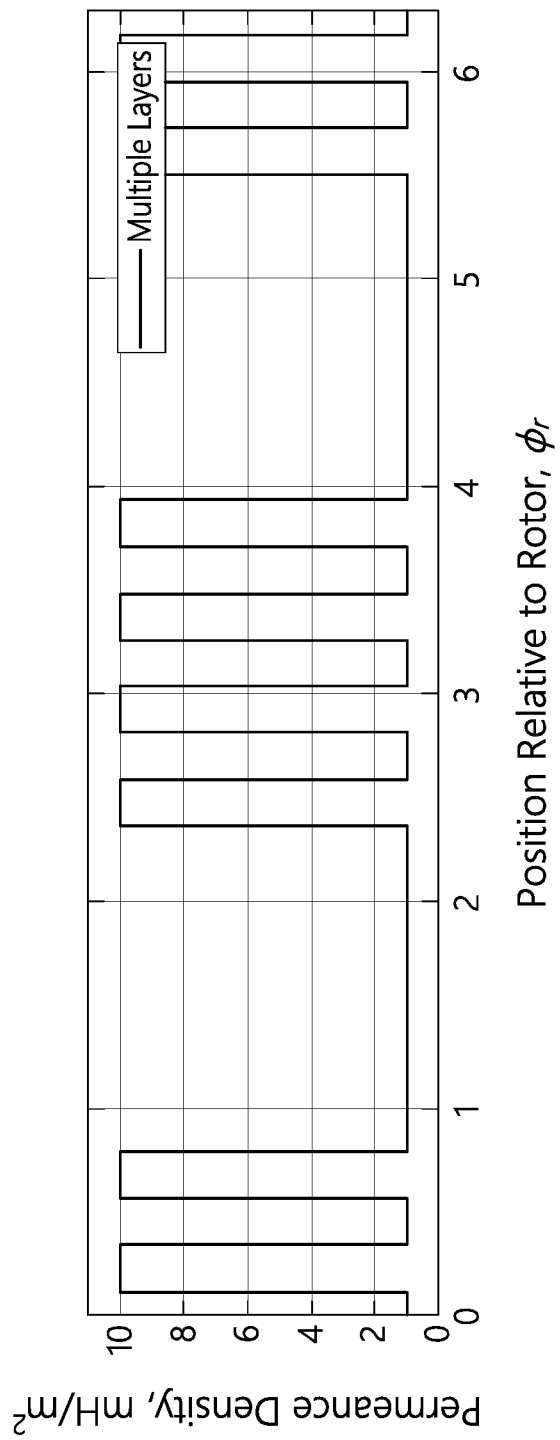
FIG. 4B illustrates an example permeance density waveform for a multi-layer IPM.
Figure 4C:
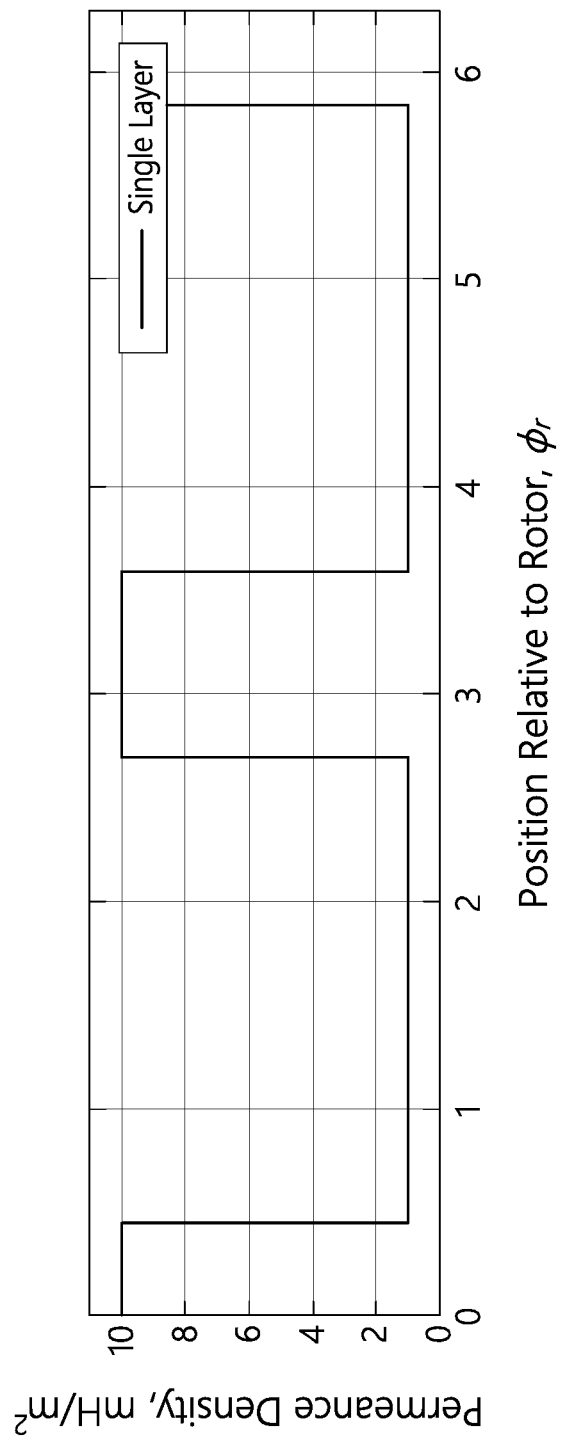
FIG. 4C illustrates an example permeance density waveform for a single-layer IPM.

FIG. 4A depicts the waveforms of the q- and d-axis winding functions for the example IPM machines. In addition, a simplified typical permeance density profile is presented for both cases, in that FIG. 4B illustrates an example permeance density waveform for a multi-layer IPM motor and FIG. 4C illustrates an example permeance density waveform for a single-layer IPM motor, as shown in FIGS. 2A and 2B. It is noted that the permeance value is high in locations where the rotor steel branch meets the air-gap and low in between. For the multi-layer case, it is assumed that the rotor slot (or flux barrier) depth is equal to the steel branch depth. It is also assumed that in a single-layer configuration, the total width of the single branch is equal to the combined width of the steel branches of the multi-layer case. As a result, one may assume that the two cases use approximately the same amount of material.

Applying Equations (5) and (6) above for the multi-layer case, $L_q=0.1592$ H and $L_d=0.068$ H; thus the resulting saliency ratio, $L_q/L_d$, is 2.34. For the single-layer case, $L_q=0.1848$ H and $L_d=0.0424$ H, and the resulting saliency ratio is 4.36. Overall, this represents a ~86% increase in saliency for the single-layer case versus the multi-layer case for this particular example.

Some conventional IPM machines have only one slot in the rotor for the magnet. Although $L_q$ is expected to be high for such machines, $L_d$ is also expected to be higher than that of the disclosed machine. Further, previous IPM machine designs do not contain benefits for magnet torque, as described herein relating to the varying magnet thickness.

Overview of Example Magnet Flux Leakage

Figure 5:
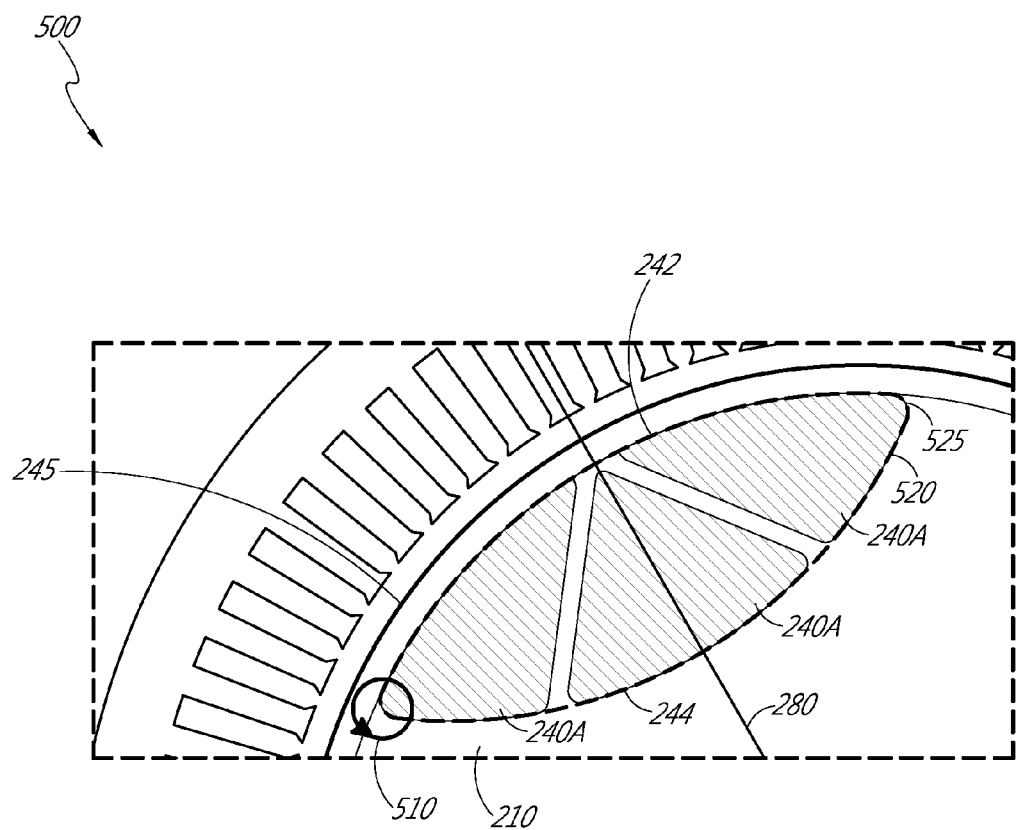
FIG. 5 illustrates an example magnet leakage flux path for an IPM as illustrated in FIG. 2A.

FIG. 5 illustrates an example magnet leakage flux path 510 for an IPM 200A as illustrated in FIG. 2A. The benefits to the magnet leakage may be seen by considering FIG. 5. The flux from the radiused corners 525 of the magnets is used to saturate a small amount of the rotor steel. A lower amount of saturation is expected to be required to allow flux from the deeper sections of the magnet (being further away) to proceed into the air-gap and on to the stator. As described herein, a flux barrier of the rotor having substantially no air gaps refers to the shape of the rotor 210 and/or magnet retention structure 245 around the radiused corners 525 of the flux barrier 520. As in the illustrated example, the rotor 210 and magnet retention structure 245 are shaped to be flush with the radiused corners 525 of the flux barrier 520. Manufacturing imperfections may cause small gaps between the rotor and/or magnet retention structure 245 and the perimeter of the magnet 240A, however no substantial air gaps are designed into the topology. In some implementations, the rotor shape may include a gap (not shown) for a magnet placement tool used to insert the magnets 240A, however this can be filled with a magnetically inert or low-permeability material, for example injection molded plastic, to avoid introducing a substantial air gap.

As illustrated, a magnet leakage section 510 of the set of magnets 240A in flux barrier 520 is located at the radiused corner 525 of the flux barrier 520. Due to the tapering of the flux barrier 520 toward the corners 525 at opposing sides the magnet leakage section 510 has a minimal thickness compared to the central portion of the flux barrier 520 along the d-axis 280. Due in part to the minimal thickness of the radiused corner 525 and the lack of substantial air gaps in the flux barrier 520, only a small portion of the rotor 210 and/or magnet retention structure 245 becomes saturated. Magnetically, the saturated portions behave like air. Thus, the majority of the flux of to the magnet is focused between the saturated portions near the radiused corners 525 to provide torque.

Implementing Systems and Terminology

Implementations disclosed herein provide topologies for an interior permanent magnet machine with improved performance.

The systems and methods above have been described in general terms as an aid to understanding details of preferred embodiments of the present invention. Other preferred embodiments of the present include the described application for electric vehicles. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, the term "or" as used herein is generally intended to mean "and/or" unless otherwise indicated. Combinations of components or steps will also be considered as being noted, where terminology is foreseen as rendering the ability to separate or combine is unclear. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. As used herein, the term "plurality" denotes two or more. For example, a plurality of components indicates two or more components. The phrase "based on" does not mean "based only on," unless expressly specified otherwise. In other words, the phrase "based on" describes both "based only on" and "based at least on."

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed is:

1. An interior permanent magnet electrical machine comprising:
    a magnet retention structure comprising a circular inner perimeter having a radius;
    a rotor body comprising:
        a magnetically permeable material configured for conducting magnetic flux,
        a plurality of rotor pole shoes, an outer edge of each of the plurality of rotor pole shoes having the same radius as the circular inner perimeter of the magnet retention structure and positioned adjacent to the circular inner perimeter of the magnet retention structure, and
        a plurality of curved edges, each of the plurality of curved edges having a curvature and connecting outer edges of an adjacent two of the plurality of rotor pole shoes; and
    a plurality of magnetic poles, each of the plurality of magnetic poles comprising:
        a curved outer edge having the same radius as the circular inner perimeter of the magnet retention structure and positioned adjacent to the circular inner perimeter of the magnet retention structure,
        an inner edge having the same curvature as the one of the plurality of curved edges of the rotor body and positioned adjacent to the one of the plurality of curved edges,
        at least one low-permeability material filling an area formed between the curved outer edge and the inner edge, the at least one low-permeability material comprising at least one magnetized permanent magnet having a varying thickness between the curved outer edge and the inner edge; and
        at least one magnet support extending from the rotor body to the magnet retention structure through the varying thickness of the at least one permanent magnet set.

2. The interior permanent magnet electrical machine of claim 1, wherein the curved outer edges of the plurality of magnetic poles and the outer edges of the plurality of pole shoes form a circle having the same radius as the circular inner perimeter of the magnet retention structure.

3. The interior permanent magnet electrical machine of claim 1, wherein the magnet retention structure comprises a carbon fiber sleeve positioned around the rotor body and the plurality of magnetic poles.

4. The interior permanent magnet electrical machine of claim 3, wherein, for each of the plurality of magnetic poles, the at least one magnetized permanent magnet fills the area formed between the curved outer edge and the inner edge.

5. The interior permanent magnet electrical machine of claim 1, the magnet retention structure comprising the magnetically permeable material and formed integrally with the rotor body.

6. The interior permanent magnet electrical machine of claim 5, wherein the magnet retention structure further comprises the at least one magnet support extending through one of the plurality of magnetic poles to the circular inner perimeter, the at least one magnet support comprising the magnetically permeable material and formed integrally with the rotor body.

7. The interior permanent magnet electrical machine of claim 6, wherein the at least one low-permeability material for the one of the plurality of magnetic poles comprises the at least one magnet support and a plurality of magnetized permanent magnets.

8. The interior permanent magnet electrical machine of claim 1, wherein the rotor body comprises a stack of a plurality of laminated steel sheets.

9. The interior permanent magnet electrical machine of claim 1, wherein the inner edge of each of the plurality of magnetic poles and the plurality of curved edges of the rotor body are shaped based at least partly on a portion of a sine wave generated by a d-axis winding function for the rotor body.

10. The interior permanent magnet electrical machine of claim 1, wherein the inner edge of each of the plurality of magnetic poles and the plurality of curved edges of the rotor body are shaped based at least partly on a circular curve, a hyperbolic curve, a parabolic curve, an elliptical curve, or a cubic curve.

11. The interior permanent magnet electrical machine of claim 1, wherein each of the plurality of magnetic poles has substantially no air gaps.

12. A rotor assembly for an interior permanent magnet electrical machine, the rotor assembly comprising:
  a magnet retention structure comprising a circular inner perimeter having a radius;
  a rotor body comprising a plurality of rotor pole shoes, an outer edge of each of the plurality of rotor pole shoes having the same radius as the circular inner perimeter of the magnet retention assembly;
  a plurality of magnetic poles each defined at least partly by a negative space in the rotor body, each of the plurality of magnetic poles positioned between an adjacent two of the plurality of rotor pole shoes and having a varying thickness that is largest at its center and that tapers toward a smallest thickness at opposing edges, each of the plurality of magnetic poles comprising at least one permanent magnet having the varying thickness; and
  at least one magnet support extending from the rotor body to the magnet retention structure through the varying thickness of the at least one permanent magnet.

13. The rotor assembly of claim 12, wherein the at least one permanent magnet comprises a stack of magnets, wherein a shape of the stack of magnets approximates a lens-shaped curvature.

14. The rotor assembly of claim 13, wherein each magnet in the stack of magnets has a rectangular or trapezoidal cross-section.

15. The rotor assembly of claim 12, wherein each of the plurality of magnetic poles includes no air gaps.

16. The rotor assembly of claim 12, wherein each of the plurality of magnetic poles comprises rounded vertices at the opposing edges.

17. The rotor assembly of claim 12, wherein the curved outer edges of the plurality of magnetic poles and the outer edges of the plurality of pole shoes form a circular profile having the same radius as the circular inner perimeter of the magnet retention structure.

* * * * *